Dec. 25, 1951      E. H. SEYMOUR      2,580,132
HERMETICALLY SEALED PACKAGE FOR MIXING AND DISCHARGING PAINT
Filed March 14, 1950
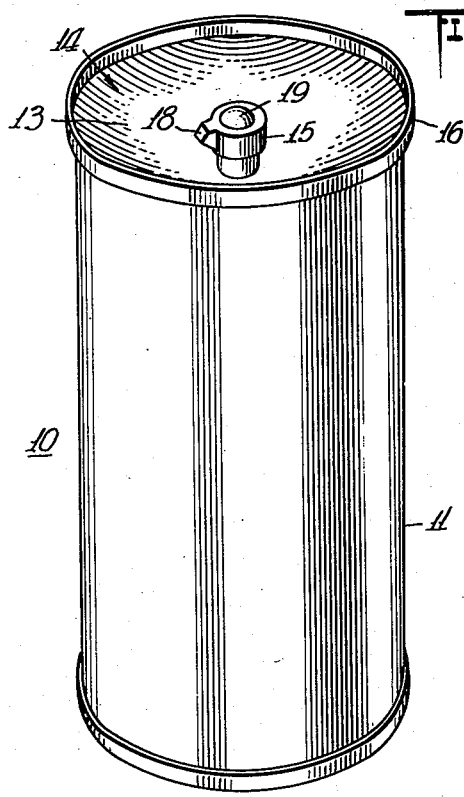
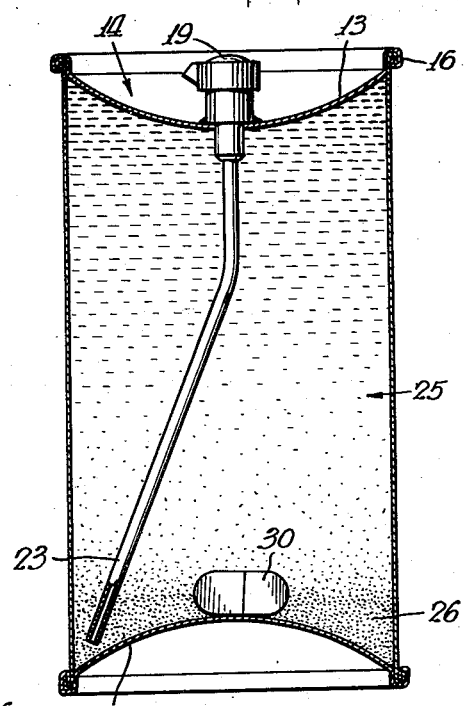
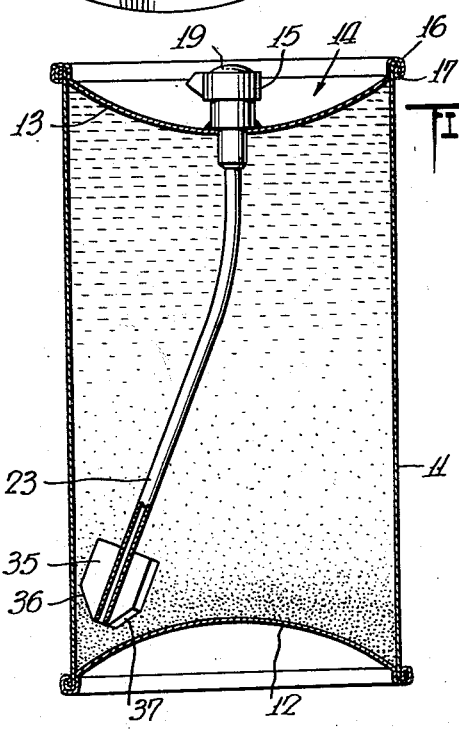
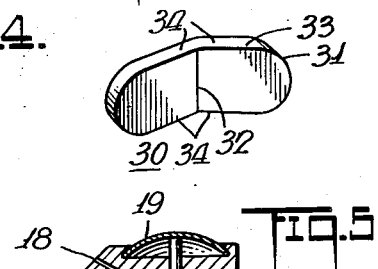
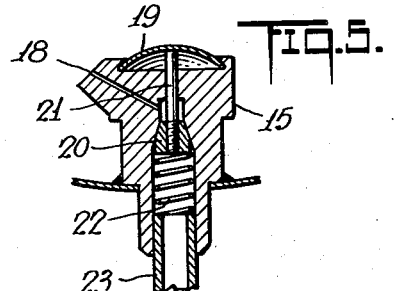
INVENTOR
*Edward H. Seymour*
BY
*Benjamin Sweedler*
ATTORNEY Patented Dec. 25, 1951

2,580,132

UNITED STATES PATENT OFFICE 2,580,132

HERMETICALLY SEALED PACKAGE FOR MIXING AND DISCHARGING PAINT

Edward H. Seymour, Sycamore, Ill.

Application March 14, 1950, Serial No. 149,555

4 Claims. (Cl. 259—29)

This invention relates to a hermetically sealed package containing a suspension of finely divided solid material in a liquid, and more particularly to a hermetically sealed paint package.

The packaging of paints and other suspensions in the form of a partial solution in a highly volatile solvent such, for example, as a liquefied gas including among others halogenated hydrocarbons, e. g., methyl chloride, dichloro-difluoro methane (Freon 12), dichloro-monofluoro methane (Freon 21), and dichloro-tetrafluoro ethane (Freon 114), in a hermetically sealed container has been suggested. The paint is maintained in such container under the vapor pressure exerted by the solvent. As shown, for example, in Patent No. 1,892,750, granted January 3, 1933, such containers have a needle valve at the top thereof. When this valve is open, escape of the paint from the container takes place into the atmosphere with consequent rapid evaporation of the solvent upon its release into the atmosphere. This evaporation of the solvent effects atomization of the solute and the contained dispersion of solid particles. Hence, the container can be used to apply the paint or other dispersion, eliminating the necessity for using a brush for this purpose, or the mess invariably involved in transferring the paint from its original container to a conventional paint spraying apparatus.

Hermetically sealed packages for paints and other suspensions heretofore known, however, have the disadvantage that the suspended pigment or other solid tends to settle to the bottom of the hermetically sealed container and forms a solid mass, thus materially altering the concentration of the sprayed material with respect to its desired solid content. In the case of paints, such as the well known aluminum pigment paints, the material sprayed from such packages as produced prior to my invention may contain so little of the suspended pigment, due to the adherence of a substantial portion thereof to the base of the container, as to produce an unsatisfactory coating. In many cases violent manual agitation of the container before actuation of the needle valve proved inadequate to redisperse the pigment in the solution within the container to provide a satisfactory concentration of pigment in the paint discharged through the discharge orifice of the container controlled by the needle valve.

It is an object of this invention to provide a hermetically sealed container having therein a suspension of finely divided solid material dispersed in a solution under pressure in which means are provided for redispersing the solid material which may settle out and collect on the base of the container.

Another object of this invention is to provide such container with a redispersing member which is simple and inexpensive to construct and efficient in operation.

Other objects and advantages of this invention will be apparent from the following detailed description thereof.

In the preferred embodiment illustrated on the drawing the invention is shown incorporated in a hermetically sealed paint container provided with a needle valve and the description which follows will be confined to the present illustrated embodiment of the invention. It will be understood, however, that this invention is not confined to such paint or lacquer packages, but is applicable to hermetically sealed packages for storing, distributing and applying suspensions of finely divided solid materials in a liquid medium, which solid materials have a tendency to settle out and collect at the base of the container.

In the accompanying drawing forming a part of this specification and showing, for purposes of exemplification, preferred forms of this invention without limiting the claimed invention to such illustrative instances:

Figure 1 is a perspective view of a hermetically sealed container embodying my invention;

Figure 2 is a vertical section through the container of Figure 1, the agitator or redispersing member and a portion of the siphon tube being shown in elevation;

Figure 3 is a perspective view on a somewhat enlarged scale of an agitator or redispersing member;

Figure 4 is a vertical section, partly in elevation of a modified form of paint package embodying my invention; and Figure 5 is a fragmentary vertical section through one form of needle valve which may be employed in the paint package embodying my invention.

In the drawing, 10 indicates a container, desirably of aluminum, steel or other material, comprising a cylindrical side wall 11, a base 12 and a top or closure 13. Relative to the interior of the container 10 both the base 12 and top 13 are of convex shape, as shown clearly in Figures 2 and 4 of the drawing, i. e., the base from its peripheral edges is curved upwardly providing a convex surface in the interior of the container on which solid material may collect and from which such solid material may more readily be removed than in the case of a flat or concave surface.

The top 13 of the container 10, as above noted, is of convex shape relative to the interior of the container, thus providing a concave or recessed portion 14 at the top of the container. In this portion 14 a needle valve housing 15 is positioned centrally of the container with its top disposed slightly below the top edge 16 of container 10. In this way the needle valve housing 15 is protected by the peripheral upper edge portion 16 of the container during handling and storage, and damage to the needle valve minimized.

The peripheral edges of the base 12 and top 13 are suitably fastened to the flanged bottom and top edges of the cylindrical side wall 11 to form the interlocked top and bottom peripheral edges 17 which seal the upper and lower edge portions of the container against ingress of air or egress of the contents of the container. The container is thus hermetically sealed; as a practical matter access to the interior thereof cannot be had without destroying the package.

Disposed in the center of the dished or concave top 14, as above noted, is the needle valve housing 15. This needle valve may be of any desired type and may otherwise be located, although the central position shown is preferred. In the embodiment shown in Figure 5 of the drawing the needle valve comprises a housing 15 provided with a discharge duct 18, flow through which is controlled by a flexible button 19, which, when depressed, moves the valve plug 20 carried by the valve stem 21 against the action of a spring 22 thus unseating the valve plug 20 and permitting flow through siphon tube 23 and the communicating discharge duct 18. Upon release of pressure from button 19 the valve plug 20 is returned to its seat under the influence of spring 22 preventing flow of the contents of the container 10 through the siphon tube 23 and discharge duct 18. In the embodiment of the invention shown in Figure 2, siphon tube 23 is a relatively rigid tube, desirably of metal, extending from the valve housing 15 to a point just above the base 12. Preferably, siphon tube 23 terminates below the top of the convex portion of base 12, as shown in Figure 2.

A body of paint 25 consisting of a vehicle, such as linseed oil, etc., partially dissolved in a volatile solvent, such as methyl chloride, dichlorodifluoro methane (Freon 12), dichloro-monofluoro methane (Freon 21), dichlorotetrafluoro ethane (Freon 114), etc. and having suspended therein a pigment in finely divided form is disposed within container 10. The volatile solvent maintains the solution under superatmospheric pressure; the pressure depends on the particular solvent used and the temperature of the container 10. During storage pigment 26 will tend to settle to the bottom 12 and collect thereon, as shown in Figures 2 and 4.

In accordance with the embodiment of the invention shown in Figure 2, an agitator or redispersing member 30 is disposed in the container. Agitator 30 is made of a material such as steel, metal or plastic of a specific gravity substantially greater than that of the paint 25. Hence, it will settle to the bottom of the container and rest thereon. As shown in Figure 3, agitator 30 is relatively narrow, has a length approximately three times its height and has its terminal edges rounded as at 31. Also it is bent slightly along the transverse median line 32 so that it is of concavo convex shape. By making the container with its base of convex configuration and the agitator shaped as shown in Figure 3 a number of advantages are secured. Thus, the agitator 30 tends to remain in a movable condition, i. e., it will not become wedged in or secured to the space between the side wall 11 and the base 12, or to the base itself. Furthermore, the agitator provides relatively sharp elongated cutting edges identified by the reference characters 34 which contact the pigment adhering to the base 12 of the container and remove it therefrom so that it becomes redispersed in the vehicle.

During storage or upon standing of container 10 for any substantial period of time, the pigment settles and the concentration thereof builds up on the base 12 of the container, as indicated diagrammatically in Figures 2 and 4. Before the paint is applied by depressing the button 19 to open the needle valve, the contents of the container are agitated, desirably by imparting to the container a whirling motion. This causes the redisperser or agitator 30 to sweep over the base 12 removing therefrom pigment which has settled thereon. The agitation of the contents and the movement of agitator 30 causes the pigment thus removed to be redispersed in the vehicle and produces within the container a substantially homogeneous distribution of the pigment in the vehicle. The convex shape of base 12 and the elongated narrow concavo convex shape of agitator 30 cooperate to effect such redispersion of the pigment. By so shaping these members tendency of the agitator to adhere to the base is minimized, the concavo convex shape of the agitator causes it to move more readily under the forces exerted by the agitated liquid, and the convex shape of the base facilitates removal of pigment therefrom. After agitation for a few seconds the pigment will be substantially homogeneously redistributed throughout the paint vehicle. Upon depressing button 19 after such few seconds of agitation, the paint solution under the pressure generated by the solvent flows through the siphon tube 23 and discharge duct 18 to produce a fine spray of paint due to the evaporation of the solvent immediately upon its release into the atmosphere.

The modification of Figure 4 differs from that of Figure 2 chiefly in that the siphon tube 23 is of flexible material, e. g., rubber or other plastic not affected by the paint within the container. Attached to the base of this siphon tube is an agitator or redispersing member 35, which may be of the shape shown in Figure 3 or that shown in Figure 4. Redispersing member 35 is secured to the flexible siphon tube 23 in any desired manner, for example, the base of this tube may be formed with an integral attached member of hard, oil-insoluble synthetic rubber, or a metal agitating member provided with cutting edges 36, 37 permanently attached to the lower end of the siphon tube 23.

In use of the package of Figure 4, before depressing button 19 to effect spraying of the paint, the package is agitated, for example, by giving it a whirling motion. This causes the flexible tube 23 to move agitator 35 in an arc over the base 12; this movement and the agitation thus imparted to the paint removes pigment settled on the base 12 and effects the redispersion of this pigment in the vehicle.

In practice it has been found that shaking or whirling the package for a few seconds is adequate to effect redispersion of the pigment within the vehicle, such that upon spraying the paint immediately thereafter an eminently satisfactory coating results.

It will be noted this invention provides a hermetically sealed container having a suspension of finely divided solid material dispersed in a solution under pressure, which container is provided with means for redispersing the solid material which tends to settle out and collect on its base. It will be further noted that the redispersing member is simple and inexpensive to construct and efficient in operation.

Since certain changes may be made in the package embodying this invention without departing from the scope of this invention, it is intended that all matter contained in the above description or shown in the accompanying drawing shall be interpreted as illustrative and not in a limiting sense.

What is claimed is:

1. In a hermetically sealed container having therein a suspension of a finely divided solid material in a liquid medium under superatmospheric pressure and provided with a valve controlled discharge duct through which the said suspension may be discharged, in combination, a siphon tube communicating with and extending from said discharge duct to near the base of said container and a redispersing member which is relatively small, with respect to the cross sectional area of the container, which is longitudinally elongated, which is free of projections which would tend to become entangled with the siphon tube and which redispersing member has a specific gravity greater than that of said suspension, so that upon agitation of said container the redispersing member moves over the base of said container to remove therefrom solid material settling out of said suspension onto the base of said container and the redispersion of said solid material thus removed from the base of said container in said liquid medium is effected.

2. In a hermetically sealed paint package comprising a hermetically sealed container provided with a valve controlled discharge orifice through which the paint may be discharged, in combination, a siphon tube communicating with and extending from said discharge orifice to near the base of said container and a redispersing member which is relatively small, with respect to the cross sectional area of the container, which is longitudinally elongated, which is free of projections which would tend to become entangled with the siphon tube and which redispersing member has a specific gravity greater than that of said paint, so that upon agitation of said container the redispersing member moves over the base of said container to remove therefrom pigment settling out of said paint onto the base of said container.

3. A hermetically sealed cylindrical paint container having relative to the interior thereof, a convex base, a convex top producing at the top of said container a concave portion, a valve member disposed in said concave portion with its top positioned below the upper edge of the peripheral side walls of said container, a siphon tube extending from said valve member to near the base of said container, and an agitator in said container, said agitator having a specific gravity greater than that of said paint, being relatively small with respect to the diameter of said container, longitudinally elongated, free of projections which would tend to become entangled with the siphon tube, and of concavo convex shape along its longest dimension.

4. A paint container as claimed in claim 3, in which the agitator is relatively narrow and has its ends of rounded shape.

EDWARD H. SEYMOUR.

REFERENCES CITED

The following references are of record in the file of this patent:

UNITED STATES PATENTS

| Number | Name | Date |
| --- | --- | --- |
| 1,733,724 | Downs | Oct. 29, 1929 |
| 1,989,019 | O'Keeffe | Jan. 22, 1935 |
| 2,185,021 | Bellamy et al. | Dec. 26, 1939 |
| 2,244,341 | MacLean | June 3, 1941 |
| 2,412,728 | Goodhue | Dec. 17, 1946 |

FOREIGN PATENTS

| Number | Country | Date |
| --- | --- | --- |
| 138,447 | Switzerland | May 1, 1930 |
| 270,746 | Italy | Jan. 18, 1930 |